United States Patent [19]

Derderian et al.

[11] 4,443,725
[45] Apr. 17, 1984

[54] DYNAMOELECTRIC MACHINE STATOR WEDGE

[75] Inventors: Scott K. Derderian, Salem, Mass.; James C. Katsekas, Windham, N.H.

[73] Assignee: General Electric Company, Lynn, Mass.

[21] Appl. No.: 388,456

[22] Filed: Jun. 14, 1982

[51] Int. Cl.³ .............................................. H02K 3/48
[52] U.S. Cl. ................................................... 310/214
[58] Field of Search ............................... 310/214, 217

[56] References Cited

U.S. PATENT DOCUMENTS

| | | | |
|---|---|---|---|
| 1,684,255 | 9/1928 | Bergman | 310/214 |
| 4,200,818 | 4/1980 | Ruffing et al. | 310/214 |
| 4,387,316 | 6/1983 | Katsekas | 310/214 |

Primary Examiner—Donovan F. Duggan
Assistant Examiner—Anita M. Ault
Attorney, Agent, or Firm—James W. Mitchell

[57] ABSTRACT

In a dynamoelectric machine having a rotating field and a stationary stator core, electrical conductors are contained within axially-extending radial slots which are part of the stator core construction. These electrical conductors are subject to electromagnetic forces and thermal cycling effects which, over a period of time, tend to cause the electrical conductors to become loose within their slots. A system of wedges is used to retain these electrical conductors in place and in particular a dovetail wedge is used in combination with a mating surface in a stator slot.

1 Claim, 5 Drawing Figures

DYNAMOELECTRIC MACHINE STATOR WEDGE

BACKGROUND OF THE INVENTION

This invention relates to large dynamoelectric machines and stator wedging systems and in particular to an improved dovetail wedge for retaining conductor bars in stator core slots.

Large dynamoelectric machines such as electrical generators employ a laminated stator core for transmitting induced voltages to the generator terminals through stator conductor bars. The cores are usually made by assembling already-slotted punchings or laminations into an annular housing for later containing the generator rotor. The slotted punchings, when assembled, define axially-extending radial slots which terminate at the radially inner-circumference of the stator annulus. The stator bars, or conductors, are laid in the radial slots and a wedging system is used to hold the bars in place against electromagnetic forces present when the machine is operating. If the wedging system is not effective, conductor insulation may be damaged in the ensuing vibration, ultimately leading to a forced outage of the generator.

U.S. patent application Ser. No. 307,007 filed Sept. 30, 1981 to inventor Katsekas and assigned to the assignee of the present invention shows a new and improved wedging system for a dynamoelectric machine stator core. The parts to the wedging system include filler strips, pressure wedges, curling wedges and dovetail wedges. This new wedging system increases the radial force applied against the conductor bars thereby providing a higher performance wedging system than was heretofore available in the industry. A machine under operating conditions might produce bar forces on the order of from 5 to 20 lbs/in. whereas the new wedging system as described in the aforesaid patent application generates radial forces on the order of from 30 to 100 lbs/in. against the bar forces. In other words, the new wedging system provides an antibar force of from 5 to 6 times the magnitude of the bar forces encountered in the operation of the machine. For this reason, the present invention has been developed to ensure the performance and longevity of the stator wedge.

U.S. Pat. No. 4,200,818 to Ruffing et al. issued Apr. 29, 1980 shows a dovetail wedge which is comprised of two distinct pieces; namely, a glass fiber core surrounded on at least two sides with a facing layer of mat fiber; i.e., Kevlar, both parts being resin impregnated. The mat fiber provides a protective and lubricating interface between the stator core laminations and the stator slot wedges. The stator core laminations each have an electrically insulating coating which if interrupted or otherwise disturbed could lead to short circuits and localized overheating within the dynamoelectric machine.

One requirement of a stator wedge is that it be able to withstand radial forces without splitting apart. According to the Ruffing et al. patent, the typical phenolic resin Kraft paper slot wedge has a strength on the order of 1,500 lbs/in. of length. The wedge made in accordance with Ruffing et al. teaching has a strength of 3,510 lbs/in. of length. The wedge yet to be described and made in accordance with the present invention is an improvement over the prior art in that it has a strength of 9,100 lbs/in. length which represents an improvement over the prior art on the order of 260 percent.

SUMMARY OF THE INVENTION

The present invention is a slot wedge made of an interlaminar rolled construction of two plys of a prepreg epxoy-glass sheet and one ply of a woven aromatic polyamide sheet which completely surrounds and also intertwines with the epoxy-glass sheets. In other words, the wedge is formed from a spirally wound lamina of prepreg epoxy-glass and an aromatic polyamide sheet. This construction greatly enhances the strength of the wedge.

OBJECTS OF THE INVENTION

It is one object of the present invention to provide an improved slot wedge having an enhanced load carrying capability.

It is another object of the present invention to provide a new manufacturing method for making a stator core slot wedge.

The novel features believed characteristic of the present invention are set forth in the appended claims. The invention itself, however, together with further objects and advantages thereof, may best be understood with reference to the following description taken in connection with the drawings.

DETAILED DESCRIPTION OF THE INVENTION

Figure 1:
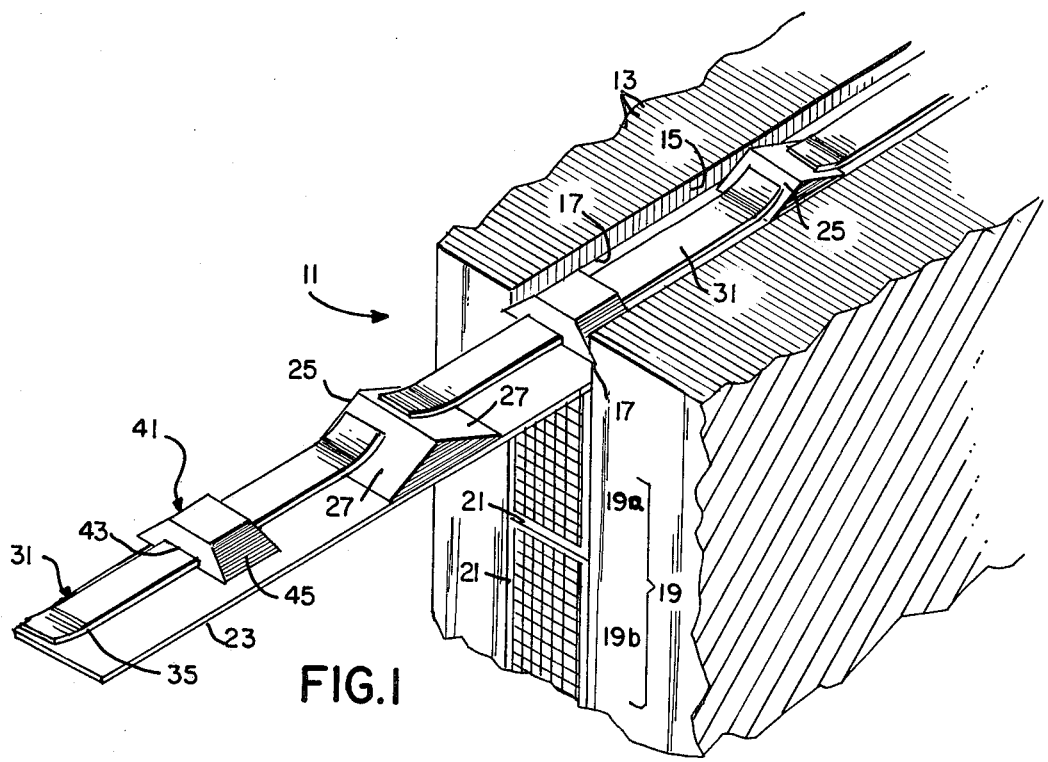
FIG. 1 is an isometric drawing of a portion of a stator core showing the environment in which the present invention is practiced.

FIG. 1 of the drawing shows a lower portion of a dynamoelectric machine stator core 11. The dynamoelectric machine has a rotor (not shown) and the stator core, the latter being an annular structure which surrounds the rotor when the rotor is assembled within the dynamoelectric machine. The stator core is assembled from a plurality of slotted punchings or laminations 13 which are pressed together in a well-known fashion and mounted on key bars (not shown). The stator core is formed with radial slots 15 spaced circumferentially around the inner annulus perimeter (only one shown) and which extend along the axial length of the stator core and which terminate at their radially inner portions in a dovetail slot 17, well known in the art. The conductors 19 comprise lightly insulated conductor strands (not shown) including radially inner and outer bars 19a and 19b, respectively. The conductors or conductor bars include electrical insulation 21 wrapped about the perimeter portions.

A filler strip 23 extends axially (longitudinally) along the slot radially inward from bar 19a. A number of pressure wedges 25 are introduced into the slot 15 and spaced apart along the axial length of the slot 15 so as to bear against the insulating filler strip 23. The pressure wedges are formed with oppositely-facing inclined surfaces 27 which facilitate the assembly of the stator bar wedging system. The material of the wedges 25 is preferably of high-strength insulating material which can be cut or molded to the shapes which are shown in the drawing. The wedges may be formed from a resinous compound employing a suitable filler to add strength or can be made from many commerically-obtainable materials such as "Textolite" (a registered trademark of the General Electric Company). In addition to the foregoing, the wedging system includes a plurality of curling wedges 31 each having a longitudinally-extending elongated body portion and terminating at each end with inclined surfaces 35 for mating with the inclined surfaces 27 in the pressure blocks. The curling wedge 31 is preferably made from 1007 Scotchply available from 3M Company or G-11 glass available from Spaulding Company.

Figure 2:
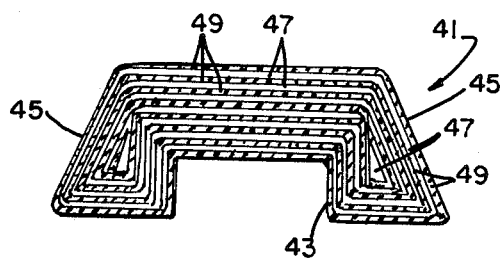
FIG. 2 is an end elevation view of a stator core wedge in accordance with the present invention.

According to the present invention, a dovetail wedge 41 is used to retain the wedge system in the stator core slot. In place, the dovetail wedge straddles the curling wedge with notch 43 and further includes inclined surfaces 45 which engage the dovetail slots 17 in the stator core slots 15. Further description of the dovetail wedge is given in connection with FIG. 2 which shows the composite nature of the wedge. The slot wedge is a spirally wound lamina of at least one resin impregnated epoxy-glass sheet 47 and at least one sheet of woven aromatic polyamide 49. As will be further explained with reference to the remaining drawings, the aromatic polyamide completely surrounds the epoxy-glass.

Figure 3:
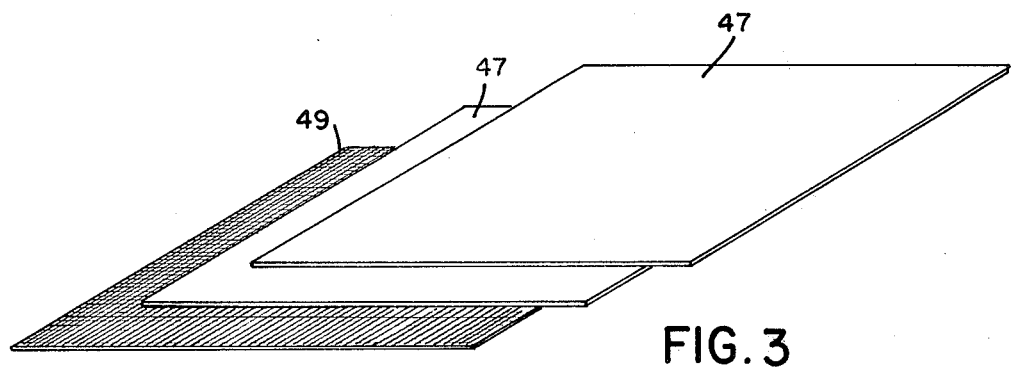
FIG. 3 is an isometric representation of a preferred arrangement of parts prior to manufacture.

FIG. 3 shows an isometric view of the initial lay up of materials for manufacture of the stator wedge. In a preferred embodiment, 2 sheets of a pre-impregnated epoxy-glass material 47 such Scotchply 1009-36 are aligned with one sheet of a woven aromatic polyamide 49 such as Kevlar 49. For a 6 inch mold length the materials are cut to approximately a 6.5 inch ×9 inch rectangle. The Scotchply 1009-36 sheet is a high-strength tape of oriented, non-woven, crossply E glass filaments preimpregnated with epoxy resin approximately 0.016 inches thick for each sheet. The Kevlar 49 tape is approximately 0.013 inches in thickness.

Figure 4:
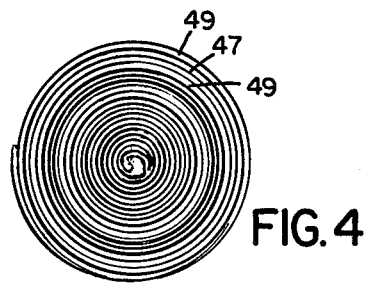
FIG. 4 shows the configuration of the invention prior to insertion into a mold.

After the initial alignment and lay up of materials, the three sheets are rolled in a jelly-roll fashion so as to achieve an interlaminar spiral form as is shown in FIG. 4. Note that the aromatic polyamide sheet 49 completely surrounds the layers of glass sheet 47 while also being present throughout the entire wedge cross-section. The rolling has been done manually with the only requirement being that the roll be able to fit in the mold. One way of enchancing this fit is to approximate the shape of the wedge or mold cavity by preforming the wedge into a convex-concave shape prior to inserting it into the mold cavity.

Figure 5:
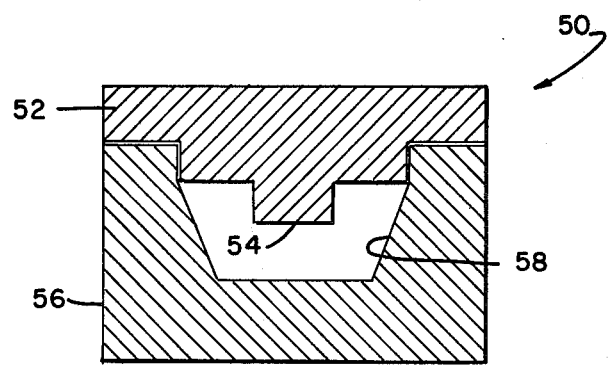
FIG. 5 shows the mold used in processing the present invention.

FIG. 5 shows a cross-section view of a press mold 50 used in the manufacture of the present invention. The press mold includes an upper plate 52 having a projection 54 which is used to form notch 43 in the wedge. The press mold also includes a base 56 having a cavity 58 formed within the base.

Once the composite spirally wound lamina is inserted in the mold, 125 psi of pressure is applied for one hour at a temperature of 160° C. After this process has taken place, the formed wedge is removed from the mold cavity and post baked in an oven for eight hours at 160° C.

Further information about the formation of the wedge is given in Table I which gives weight percentages of the wedge materials in both the cured and uncured states.

TABLE I

| Uncured Composition Weight Percent | Cured Composition Weight Percent |
|---|---|
| 56 glass | 65 glass |
| 12 Kevlar | 14 Kevlar |
| 32 epoxy resin | 21 epoxy resin |

From the foregoing, the method of making the stator wedge is quite straightforward and as follows. In a preferred embodiment, laying up and aligning two sheets of preimpregnated epoxy-glass tape and one sheet of a woven aromatic polyamide so that at least two faces of the glass tape about one another. Rolling the three sheets together in a spiral so that the woven aromatic polyamide surrounds the epoxy-glass tape. Pre-forming the rolled lamina into a crescent shape for insertion into a mold. Inserting the preformed lamina into the mold and curing said wedge at 125 psi pressure for one hour at 160° C. temperature. Post curing said wedge for eight hours at 160° C.

While there is shown what is considered to be at present a preferred embodiment of the invention, other modifications may occur to those having skill in the art. It is intended to cover in the appended claims all such modifications which fall within the true spirit and scope of the claims.

What is claimed is:

1. An improved dovetail wedge for a dynamoelectric machine wedging system wherein said wedging system includes pressure wedges bearing against stator bars, curling wedges bearing against the pressure wedges and dovetail wedges bearing against the pressure wedges and stator core slot; and, wherein the dovetail wedge improvement comprises: a three ply interlaminar rolled construction including at least two sheets of epoxy-glass plies and one sheet of woven aromatic polyamide fabric, said two glass plies abutting one another and together being wound in spiral form with the polyamide fabric so that the polyamide fabric completely surrounds the glass plies.

* * * * *